United States Patent
Spinelli

(10) Patent No.: US 8,353,490 B2
(45) Date of Patent: Jan. 15, 2013

(54) DEVICE FOR ATTACHING ELECTRONIC COMPONENTS TO FLAT-SCREEN TELEVISION

(76) Inventor: Thomas Spinelli, Monroe Township, NJ (US)

( * ) Notice: Subject to any disclaimer, the term of this patent is extended or adjusted under 35 U.S.C. 154(b) by 63 days.

(21) Appl. No.: 13/065,682

(22) Filed: Mar. 28, 2011

(65) Prior Publication Data

US 2012/0248267 A1    Oct. 4, 2012

(51) Int. Cl.
*F16M 11/00* (2006.01)
*A47F 5/00* (2006.01)

(52) U.S. Cl. ............ 248/201; 248/448; 248/287.1; 248/346.07; 211/175; 211/118

(58) Field of Classification Search .......... 248/441.1, 248/448, 460, 470, 495, 161, 207, 238, 215, 248/287.1, 274.1, 917, 337, 201, 346.07; 211/119.004, 119.009, 113, 118, 208, 207, 211/175, 90.02
See application file for complete search history.

(56) References Cited

U.S. PATENT DOCUMENTS

| | | | | |
|---|---|---|---|---|
| 2,885,090 A * | 5/1959 | Forman et al. | ............... | 211/175 |
| 3,231,230 A * | 1/1966 | Mueller | ............... | 248/449 |
| 3,352,426 A * | 11/1967 | Carlson | ............... | 211/22 |
| 3,738,606 A * | 6/1973 | Millen | ............... | 248/449 |
| 4,042,203 A * | 8/1977 | Warkentin | ............... | 248/449 |
| 4,165,856 A * | 8/1979 | Wiseheart | ............... | 248/449 |
| 4,856,749 A * | 8/1989 | Habermann | ............... | 248/448 |
| 4,949,924 A * | 8/1990 | Carmody | ............... | 248/215 |
| 5,016,893 A * | 5/1991 | Hart, Jr. | ............... | 280/35 |
| 5,439,152 A * | 8/1995 | Campbell | ............... | 224/405 |
| D367,767 S * | 3/1996 | Rhodes | ............... | D6/312 |
| 6,422,405 B1 * | 7/2002 | Haenszel | ............... | 211/175 |
| 6,883,670 B2 * | 4/2005 | Moon | ............... | 211/74 |
| 2004/0222179 A1 * | 11/2004 | Garcia | ............... | 211/206 |
| 2007/0256995 A1 * | 11/2007 | Tenreiro et al. | ............... | 211/85.7 |
| 2007/0278171 A1 * | 12/2007 | Jersey et al. | ............... | 211/188 |

* cited by examiner

*Primary Examiner* — David Dunn
*Assistant Examiner* — Guang H Guan
(74) *Attorney, Agent, or Firm* — Daniel Kirshner

(57) ABSTRACT

Bracket for attachment to a flat-screen television having a support platform for positioning electronic components below the television. The caddy comprises top support brackets which hook over the top of the television or over the television wall mount bracket and has a horizontal member abutting the top of the television, and front vertical extension member that extends down in front of the television. Extending down from the top support brackets are side vertical bars in back of the television. Attached to the bottom of the side vertical bars are horizontal bottom support brackets upon which the television sits. The electronic component support platform is attached to the bottom of the two vertical bottom side bars which includes lateral and perpendicular support bars which function to support the electronic components. Many of the bars telescope allowing its use with a variety of sized televisions and electronic components of varying sizes.

1 Claim, 6 Drawing Sheets

DEVICE FOR ATTACHING ELECTRONIC COMPONENTS TO FLAT-SCREEN TELEVISION

FIELD OF THE INVENTION

The present invention is a device for attaching electronic components such as cable boxes or dvd players and the like to a flat-screen television set or to the wall-mount bracket for a flat-screen television. More specifically, the present invention device suspends one or more electronic components below the television on a base platform and includes telescoping rods which adjust to accommodate various sizes of televisions and various sizes of electronic components.

BACKGROUND OF THE INVENTION

Many households now have flat-screen televisions such as plasma or LCD screens. These televisions typically have a depth ranging from about an inch or so and going up to two or three inches. Commonly, people attach these flat-screen televisions to a wall employing one of a multitude of prior art wall-mount brackets with or with an extension arm.

Furthermore, it is common for households that own a flat screen television to also own one or more electronic components that are utilized in conjunction with the television. Examples of such electronic components are dvd players, Blu Ray disk players, home theater receivers, cable boxes or satellite receivers. These electronic components are wired to the television and are typically placed on a shelf, placed onto a table, or placed into a audio/video cabinet.

One disadvantage of such typical arrangements is that the electronic component is situated at some distance from the television making it more difficult to make changes to the settings on both devices. Another disadvantage is that a separate piece of furniture must be employed, or in the alternative, shelf space or table top space is wasted. Furthermore, a user cannot glance at the television and simultaneously view any of the settings on the electronic component.

As such, it would be an advantage to provide a device which attaches one or more electronic components to the television set and suspends the electronic components down beneath the television. This device would provide the advantage that no separate audio/video cabinet or separate piece of furniture is used to hold the electronic component. In addition, this device would provide the further advantage that the owner can easily make changes to settings to both the television and the electronic component. Moreover, when relaxing and watching television, a viewer would be able to easily view both the television and the settings on the electronic component.

Further objectives are as follows: It is an objective of the present invention to provide a device that moves in tandem with any wall mount bracket for a flat-screen television. In other words, it is an objective of the present invention for it to turn left or right and tilt forward or backward depending on the wall mount bracket's capabilities. Moreover, it is an objective of the present invention that when installed onto a flat-screen television and is supporting one or more electronic components, it will appear to be camouflaged and floating in mid-air. As such, it is an objective that aesthetically it will be a compliment to any flat-screen television that has its own built-in wall bracket.

Other objectives, advantages and novel features, and further scope of applicability of the present invention will be set forth in the detailed description to follow, taken in conjunction with the accompanying drawings, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention device is a caddy or bracket for attachment to a flat-screen television which caddy provides an electronic component support platform for positioning one or more electronic components below the television. The caddy of the present invention comprises two top support brackets which hook over the top of the flatscreen television or over the horizontal wall mount bracket for mounting a television to the wall. The top support brackets each include a horizontal member which abuts the top of the television, and front vertical extension member that extends down from the horizontal member in the front of the television. Extending down from the top support brackets are left and right side vertical bars which are situated in back of the television when the caddy is in use. Attached to the bottom of the two side vertical bars are two horizontal bottom support brackets upon which the television sits when the invention is in use. The electronic component support platform is attached to the bottom of the two vertical bottom side bars. The electronic component support platform includes lateral and perpendicular support bars which function to provide support to the electronic components. Many of the bars of the present invention telescope thereby allowing its use with a wide variety of different sized televisions and one or more electronic components of varying sizes.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The present invention is a caddy or bracket for attaching one or more electronic components (e.g. DVD player, Blu Ray player, cable or satellite receiver, home theater receiver or the like) to a typical prior-art flat-screen television set. More specifically, the present invention caddy is a bracket which hooks over the top of the television set, or over the horizontal wall mount bracket, depending on consumer preference, and provides a platform suspended underneath the television which platform is employed to support one or more electronic components. The present invention caddy has rods which telescope thereby facilitating its use with a wide variety of flat-screen televisions and a wide variety of electronic components.

Figure 1:
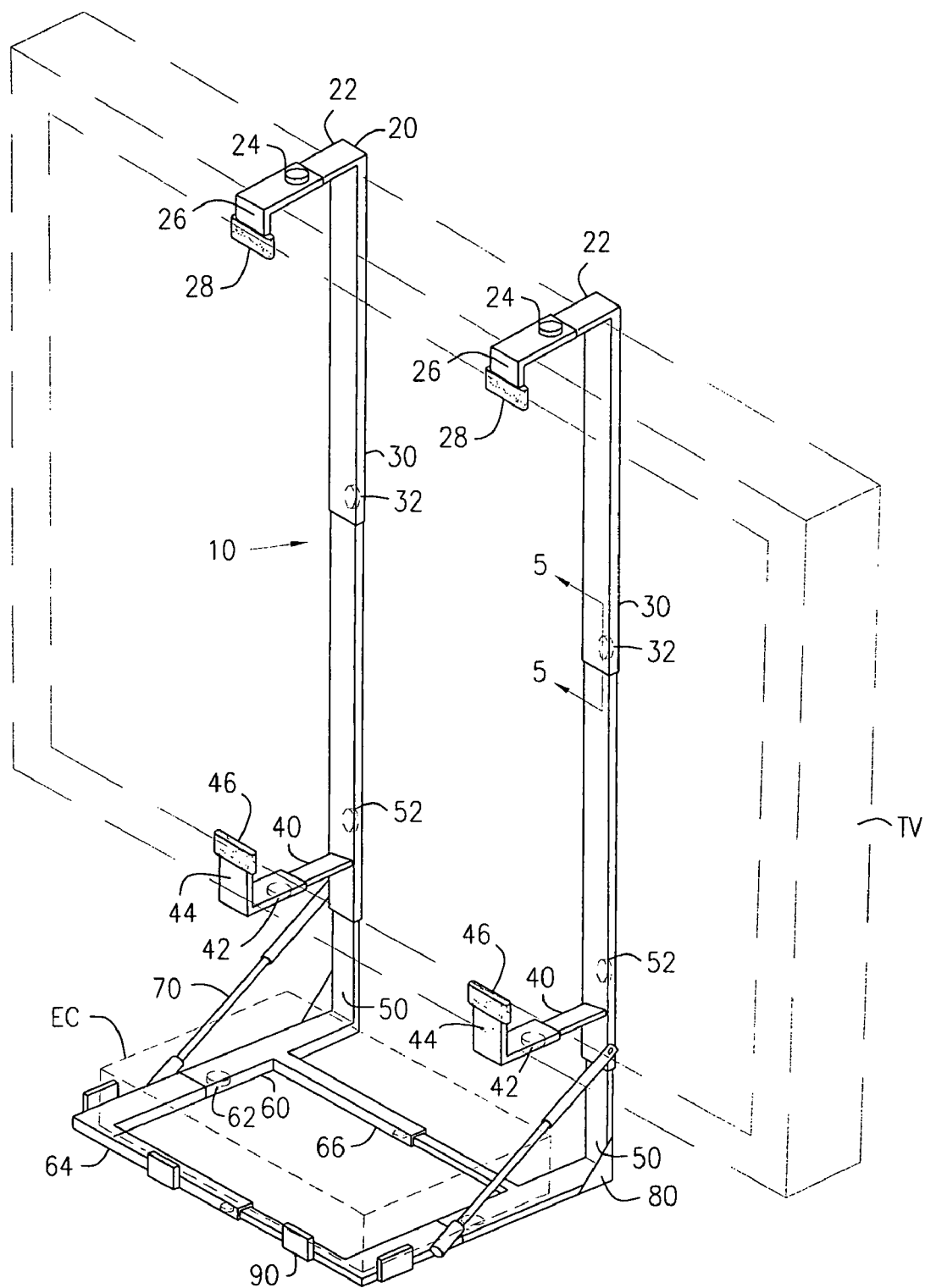
FIG. 1 is a front perspective view of the present invention device showing the prior art television and electronic component in broken lines.
Figure 2:
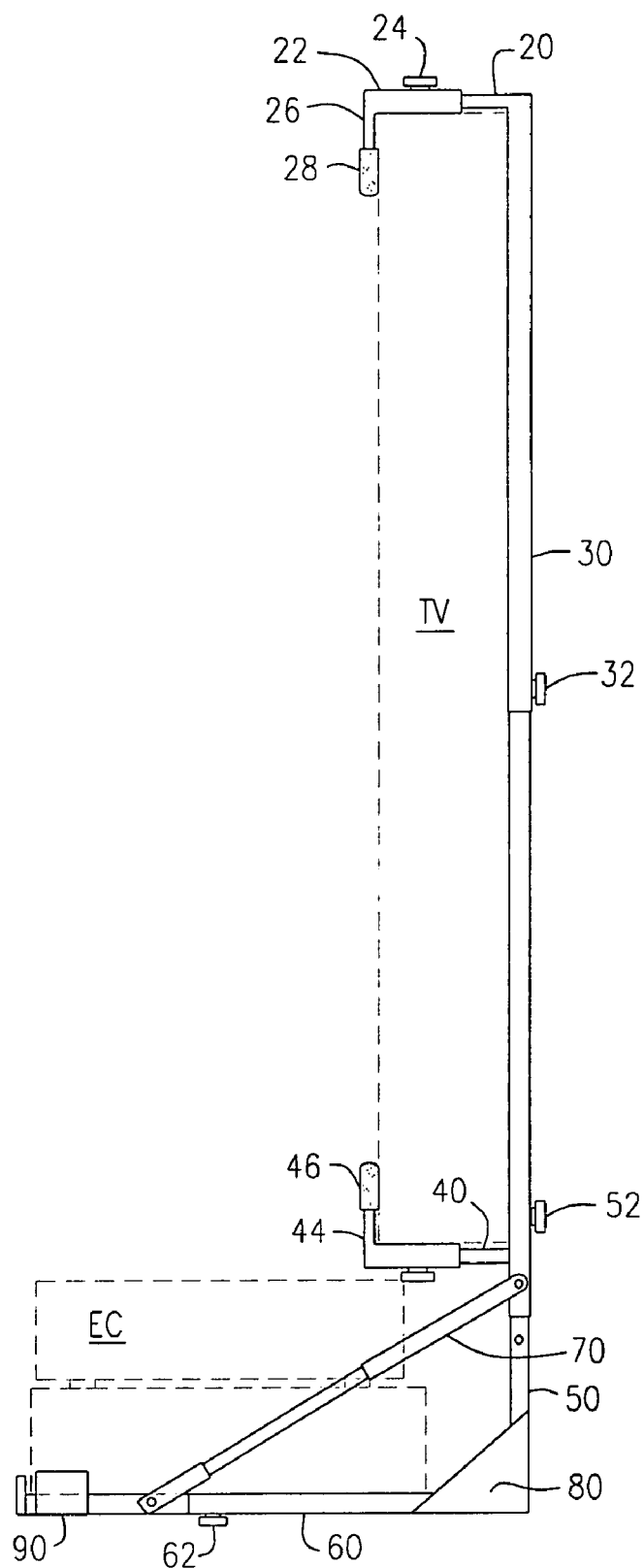
FIG. 2 is a right side view of the present invention device showing the prior art television and electronic component in broken lines.
Figure 3:
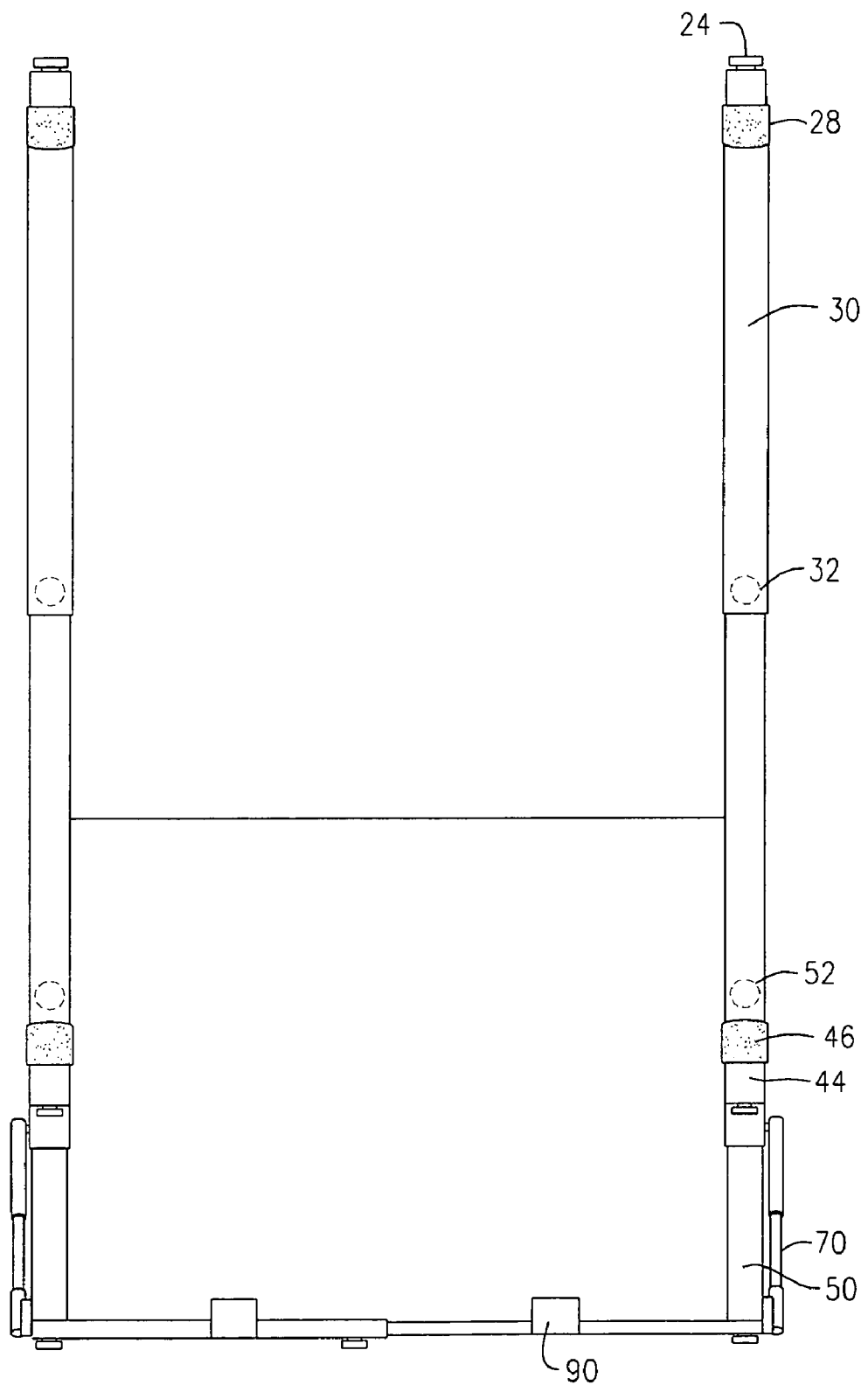
FIG. 3 is a front view of the present invention device.

Looking at the figures and first at FIG. 1, a prior-art flat screen LCD or plasma television set is depicted in broken lines and designated on the figures as TV. Typically, flat-screen televisions can range in size (measured diagonally corner to corner) from about 30 inches to 60 inches or more. Presently, the most common diagonal sizes of flat screen televisions are 42" and 50". Moreover, flat screen televisions have a front-to-back thickness ranging from about an inch or two, up to several inches. As such, the bracket of the present invention is adjustable to accommodate televisions of these various sizes. Also shown in the figure, and more specifically FIG. 1 is an electronic component (e.g. dvd player, Blu Ray disc player, home theater receiver, cable television receiver, satellite television receiver or the like) which is shown in broken lines and designated EC.

The caddy of the present invention is shown generally as 10. The caddy is formed from rigid material although in the preferred embodiment shown in the figures, the caddy is manufactured from a plastic such as polypropylene or the like. However, it will be understood, that the present invention could be manufactured from aluminum, stainless steel, other types of plastic, etc.

Looking more closely at the figures, it can be seen that extending over the top of the television are the two top support brackets 20 which support the weight of the present invention device and the weight of the electronic components suspended on a base platform beneath the television. (Although as depicted in the figures, the preferred embodiment of the present invention includes two top support brackets, there could be one or more than two, and such design would be within the scope of this disclosure.) Each top support bracket includes a horizontal aspect 22 that extends over the top of the television and abuts the top of the television. The horizontal aspect of each of the top support brackets comprises an inner member and an outer member which telescope relative to each other thereby providing means to adjust the length of the said horizontal aspect, and which are thereupon locked into place relative to each other utilizing the locking screw 24. (As with all the locking screws disclosed herein, the locking screw may be replaced with other locking members to lock together the telescoping rods. For example, a locking member in the nature of a spring-loaded hole and button is within the scope of the disclosure of this invention.) As shown, the horizontal aspect of the top support bracket may is adjustable in the range of 2½ inches to 5 inches. Moreover, as shown, the width of the top support bracket is 1 inch and the depth of the top support bracket is 5/16 inch.

Figure 8:
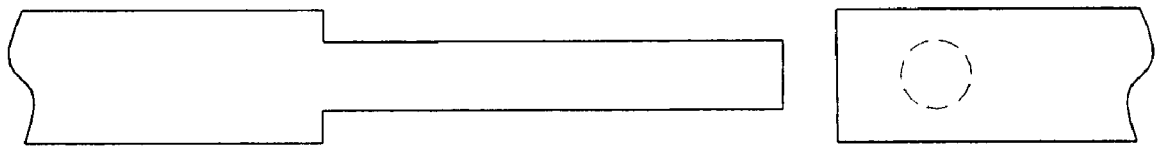
FIG. 8 is a cut away and exploded view of one of the rods of the present invention device showing its telescoping function.

In like fashion to the telescoping function of the top support brackets, several other rods of the present invention telescope. The telescoping function of these rods is well depicted in FIG. 8, a cut away and exploded view of one the said telescoping rods.

Extending downward from the front of the horizontal aspect of the two top support brackets are front vertical extension pieces 26 which connect to the horizontal aspects at an angle of approximately 90°. The vertical extension pieces of the top support brackets extend downward in front of the bezel at the top of the television and have dimensions of 1" in width, ¾" in height and 5/16" in depth. Placed onto the end of the front vertical aspects of the top support bracket are caps 28 which caps are formed from rubber or other such soft pliable material and protect the television from damage. Moreover, peel and stick felt pads are placed between the caps and the television to further protect the television.

Figure 5:
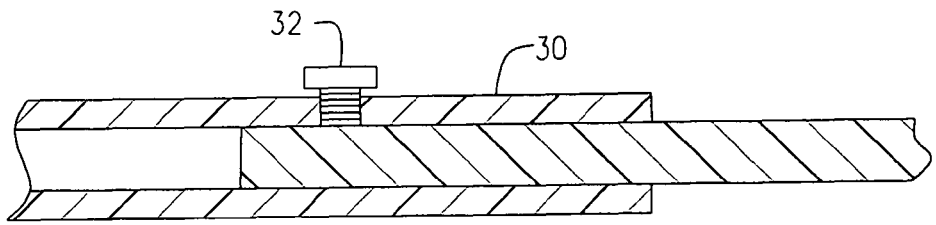
FIG. 5 is a cross-sectional view of one of the side vertical bars with the section taken at 5-5 of FIG. 1.

Extending downward from the back of the top horizontal aspects are the left and right side vertical bars 30. (Again, as in the case with the top support brackets, there could be more or less than two side vertical bars, so long as it is the same quantity as the top support brackets.) The side vertical bars extend downward and when in use are positioned behind the rear of the flat screen television. The side vertical bars are adjustable to accommodate a variety of television sets of different sizes. Specifically, the side vertical bars have a width of 1 inch, a depth of 5/16 inch and a length that is adjustable in the range of 23 inches to 46 inches. Referencing FIG. 1 seen in conjunction with FIG. 5 (FIG. 5 is a cross-sectional view of a side vertical bar with the section taken at 5-5 of FIG. 1), the side vertical bars telescope to permit length adjustment in the aforementioned range. The two telescoping members may be locked in place relative to each other by employing the locking screw 32.

The bottom support brackets 40 protrude outward and have a horizontal aspect 41 which extend in a horizontal direction near the bottom of the side vertical bars 30. The horizontal aspects of the bottom support brackets extend in the same direction and substantially parallel to the horizontal aspects of the two top support brackets 20. In similar fashion to the top support brackets, the bottom support brackets 40 telescope to accommodate flat screen televisions of varying depths and the telescoping members are locked in place through use of the locking screws 42. Specifically, the horizontal aspects of the bottom support brackets have dimensions similar to that of the horizontal aspects of the top support brackets. The bottom of the flat screen television is positioned onto the horizontal aspects of the bottom support bracket.

Furthermore, extending upward from the horizontal aspect of the bottom brackets are the two vertical aspects 44 of the bottom support bracket which are 2" in height, 1" in width and 5/16" in depth. The vertical aspects 44 are positioned in front of the bezel at the bottom of the flat-screen television when the present invention caddy is in use. In similar fashion to the top support brackets, rubber caps 46 are placed onto the ends of the vertical aspects which rubber caps protect the television from damage. Felt pads are placed between the rubber caps and the front of the television.

Extending downward from the side vertical bars 30 are left and right vertical bottom side bars 50. The vertical bottom side bars have a length of 10" and telescope in relation to the side vertical bars 30 in order to make their overall length adjustable in the range of 5" to 10" which adjustment permits this device to be utilized to hold one or more electronic components of varying heights. The locking screws 52 are utilized to lock the bottom vertical bottom side bars in place relative to the side vertical bars.

Figure 4:
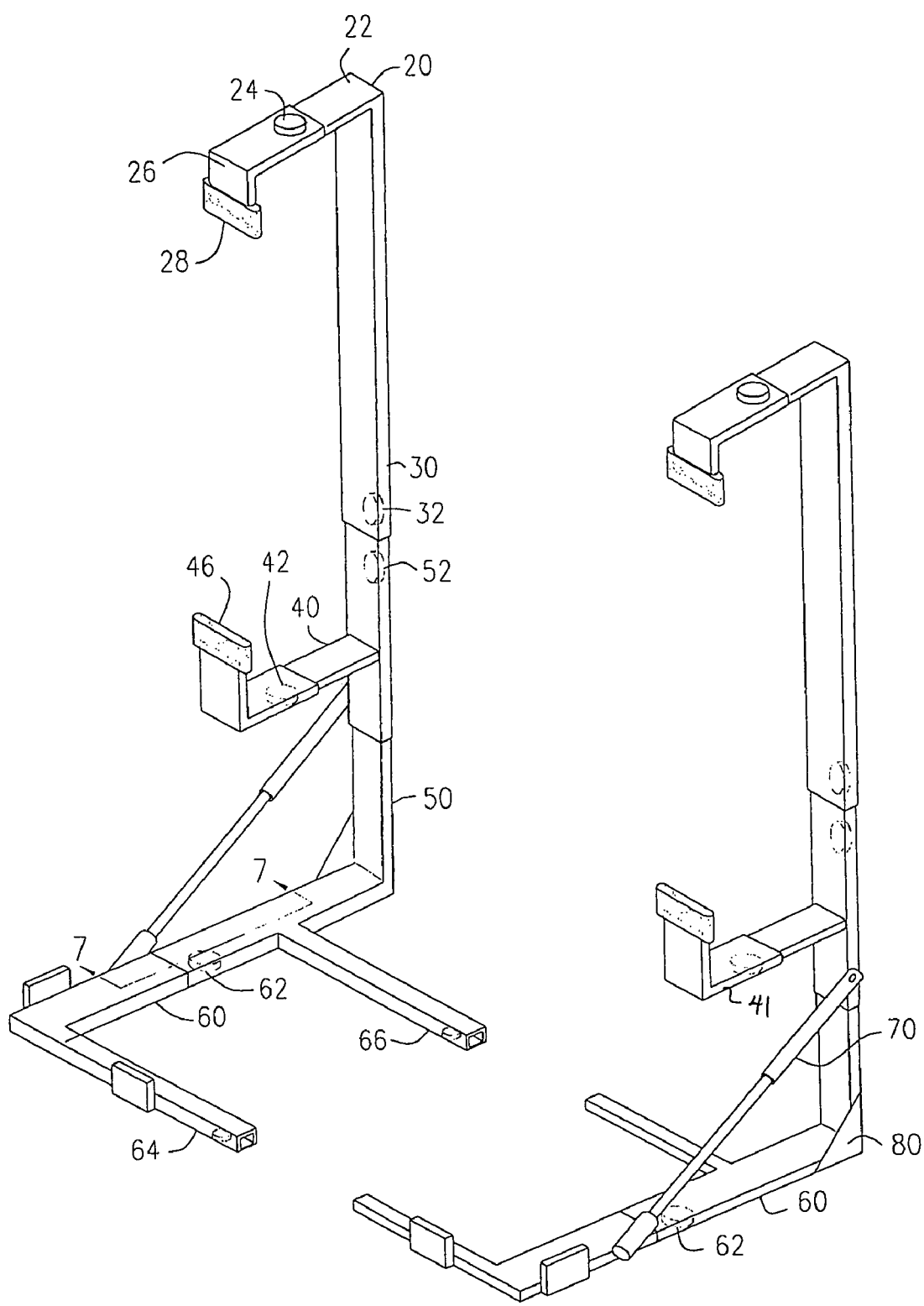
FIG. 4 is a front perspective view of the present invention device.
Figure 6:
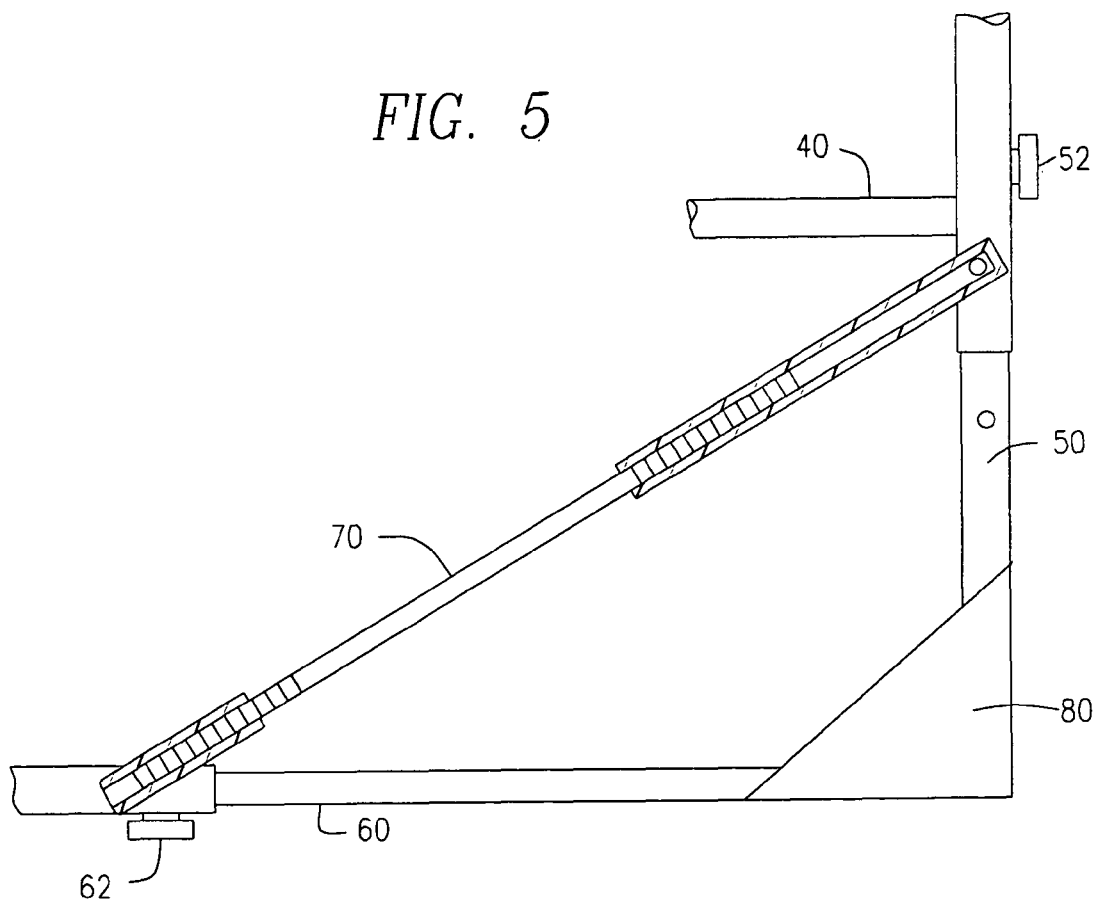
FIG. 6 is a side view of the electronic device support platform.
Figure 7:
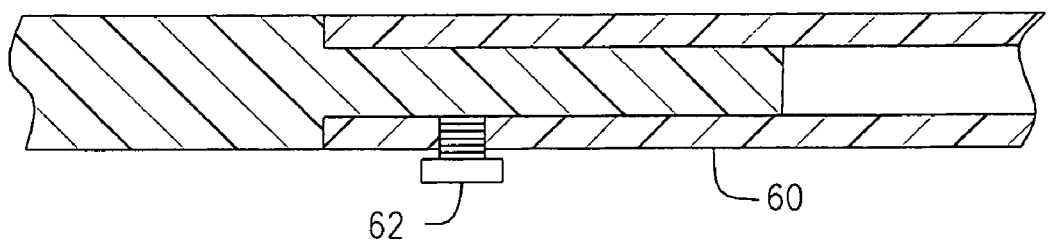
FIG. 7 is a cross-section view of one of the bottom lateral member with the section taken at 7-7 of FIG. 4.

Turning attention now to FIGS. 1, 4 and 6, located horizontally at a 90° angle relative to the vertical side bottom bars is the electronic device support base platform upon which one or more electronic devices can be positioned. The electronic support base platform includes left and right lateral members 60 which extend outward horizontally from the bottom of the vertical bottom side bars 50. Now looking at FIG. 4 in conjunction with FIG. 7 (FIG. 7 is a cross-sectional view taken at 7-7 in FIG. 4) it can be seen that the left and right lateral members 60 telescope in order to make their overall lengths adjustable in the range of 10 inches to 20 inches to accommodate electronic components of varying depths. The left and right bottom members are locked into position relative to each other employing the locking screws 62. At right angles to the left and right bottom members are the perpendicular bottom support bars 64 and 66, which bottom support bars are situated underneath the electronic component and lends support thereto. The bottom support bars telescope in order to make their overall length adjustable in the range of 12 inches to 24 inches to accommodate electronic components of varying widths. As such, it will be understood that both the width and the depth of the electronic device support base platform is adjustable so that any electronic device can be supported. Moreover, since the left and right vertical bottom side bars 50 are also adjustable in length, the bottom support platform is adjustable in all three directions: height, width and depth thereby accommodating one or more electronic components of varying heights, widths and depths.

Support rods 70 are provided which support rods extend from the bottom of the left and right side vertical bars 30 angularly to the left and right bottom lateral members 60. The support rods add strength and rigidity to the electronic device support base platform. The support rods are telescoping and thereby adjustable in length from 4 inches to 8 inches depending on the requirements of the length of the rods to which they are attached. As an alternative to the support rods, the device may include larger triangular corner pieces 80 to add strength and rigidity to the base platform. The width would be 10 inches by 3 inches in height to maintain its rigidity.

Attached to the front and the side of the bottom support platform are the electronic component protection guards 90. The electronic component protection guards extend upward from the bottom support platform and prevent the electronic component from sliding off of the base platform.

To utilize the caddy of the present invention, a user first hooks the two top support brackets 20 over the top of the flat-screen television with the its horizontal aspect 22 abutting the top of the television and its front vertical extension pieces 26 extending down in front of the television. The felt pads may be placed between the rubber caps 28 and the television for further protection. The left and right side vertical bars 30 extend downward behind the flat screen television. The user will select the length of the left and right side vertical bars using their telescoping function and lock them in length depending on the size of the television. When properly adjusted, the bottom of the television will rest on the two bottom support brackets 40 and the television fits snugly. The user telescopes the top support brackets 20 and the bottom support brackets 40 to adjust for the width of the flat-screen television which are then locked into the chosen position with the locking screw.

Now depending on the number of electronic components to be placed on the bottom electronic device support base platform is position in height employing the telescoping function of the left and right vertical bottom side bars 50 which are then locked into the chosen position with the locking screw.

Finally, the depth and width of the bottom electronic device support base platform is adjusted according the length and width of the electronic devices to positioned thereupon. The length and width are adjusted employing the telescoping function of the left and right lateral members 60 and the perpendicular support bars 64 and 66, and then locked in place with the locking screws.

Now, the electronic device or devices are positioned onto the bottom electronic device support base platform and are wired electronically to the flat screen television.

Due to the novel structure and functionality of the present invention caddy, the need for a separate audio/video cabinet or separate shelf for placement of the electronic device is eliminated. The electronic device or devices are situated directly underneath the flat-screen television so that the viewer can see both the picture on the television as well as the settings on the electronic device with a quick glance. The user can easily make quick changes to the settings on the television as well as the electronic component. The caddy of the present invention has the ability to move in tandem with any flat-screen television wall mount. This means that it will have the ability to turn left and right and tilt forward or backward depending on the wall mount's capabilities. Furthermore, when in use, the caddy of the present invention will appear to be camouflaged and floating in mid air and will thereby be a an absolute compliment to any flat-screen television that has a built-in wall mount bracket.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed:

1. A caddy for attaching one or more electronic components to a flat screen television, said flat screen television having a top surface, comprising:

a top support bracket, said top support bracket utilized to support the weight of said caddy and said one or more electronic components, said top support bracket having a telescoping horizontal aspect which is positioned on the top surface of said flat screen television, and a vertical extension piece extending down vertically from said horizontal aspect, said vertical extension piece positioned at the top of the front of said flat screen television;

a telescoping side vertical bar, said side vertical bar extending down vertically from the top support bracket and behind said flat screen television;

a bottom support bracket attached to said side vertical bar, said bottom support bracket having a telescoping horizontal aspect upon which the bottom of the flat screen television rests and a vertical aspect positioned at the bottom of the front of said flat screen television;

a vertical bottom side bar which extends downward from said side vertical bar, said vertical bottom side bar telescoping relative to said side vertical bar;

and an electronic device support platform extending horizontally from said vertical bottom side bar, said electronic device support platform for suspending said one or more electronic components below said television, said electronic device support platform having lateral and perpendicular members with respect to said vertical bottom side bar, wherein both said lateral and said perpendicular members of said platform telescope.

* * * * *